United States Patent
Messing et al.

(10) Patent No.: US 10,464,592 B2
(45) Date of Patent: Nov. 5, 2019

(54) STEERING COLUMN MOTION CONTROL ASSEMBLY

(71) Applicant: STEERING SOLUTIONS IP HOLDING CORPORATION, Saginaw, MI (US)

(72) Inventors: Nicholas M. Messing, Freeland, MI (US); Benjamin D. Reichard, Saginaw, MI (US); Scott A. Stinebring, Auburn, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 95 days.

(21) Appl. No.: 15/797,580

(22) Filed: Oct. 30, 2017

(65) Prior Publication Data

US 2019/0126968 A1    May 2, 2019

(51) Int. Cl.

| | |
|---|---|
| *F16H 3/06* | (2006.01) |
| *F16H 27/02* | (2006.01) |
| *F16H 29/02* | (2006.01) |
| *F16H 29/20* | (2006.01) |
| *B62D 1/19* | (2006.01) |
| *F16H 25/20* | (2006.01) |
| *B62D 1/181* | (2006.01) |

(52) U.S. Cl.
CPC ............. *B62D 1/195* (2013.01); *B62D 1/181* (2013.01); *F16H 25/20* (2013.01)

(58) Field of Classification Search
CPC ............................... B62D 1/195; B62D 1/181
See application file for complete search history.

(56) References Cited

U.S. PATENT DOCUMENTS

| | | |
|---|---|---|
| 3,501,993 A | 3/1970 | Swenson |
| 3,719,255 A | 3/1973 | Daniels et al. |
| 4,142,423 A | 3/1979 | Ikawa |
| 5,082,311 A | 1/1992 | Melotik |
| 5,375,881 A | 12/1994 | Lewis |
| 5,511,823 A | 4/1996 | Yamaguchi et al. |
| 5,520,416 A | 5/1996 | Singer, III et al. |
| 5,562,307 A | 10/1996 | Connor |
| 5,722,299 A | 3/1998 | Yamamoto et al. |
| 5,848,557 A | 12/1998 | Sugiki et al. |

(Continued)

FOREIGN PATENT DOCUMENTS

| | | |
|---|---|---|
| JP | 2004291691 A | 10/2004 |
| JP | 2011057020 A | 3/2011 |

*Primary Examiner* — Jake Cook

(57) ABSTRACT

A steering column assembly includes a lower jacket assembly extending along a steering column axis. Also included is an upper jacket assembly at least partially received within the lower jacket assembly, the upper jacket assembly extendable along the steering column axis relative to the lower jacket assembly. Further included is a telescope actuator assembly configured to translate the upper jacket assembly relative to the lower jacket assembly. Yet further included is a telescope drive bracket of the telescope actuator assembly, the telescope drive bracket operatively coupled to the upper jacket assembly with a mechanical fastener disposed in a bracket slot located within the telescope drive bracket, the mechanical fastener moveable with the upper jacket assembly in a single axial direction along the steering column axis.

18 Claims, 3 Drawing Sheets

(56) References Cited

U.S. PATENT DOCUMENTS

| | | |
|---|---|---|
| 6,142,485 A | 11/2000 | Muller et al. |
| 6,322,103 B1 | 11/2001 | Li et al. |
| 6,328,343 B1 | 12/2001 | Hosie et al. |
| 6,439,357 B1 | 8/2002 | Castellon |
| 6,578,872 B2 | 6/2003 | Duval et al. |
| 6,659,504 B2 | 12/2003 | Riefe et al. |
| 7,188,867 B2 | 3/2007 | Gatti et al. |
| 7,516,991 B1 | 4/2009 | Cheng |
| 8,430,428 B2 | 4/2013 | Tinnin |
| 8,627,742 B2 | 1/2014 | Ridgway et al. |
| 8,764,064 B2 | 7/2014 | Riefe |
| 8,935,968 B2 | 1/2015 | Sugiura |
| 9,022,426 B2 | 5/2015 | Sakata |
| 9,022,427 B2 | 5/2015 | Schnitzer |
| 9,428,213 B2 | 8/2016 | Tinnin |
| 9,637,161 B2 | 5/2017 | Orihara et al. |
| 9,643,641 B1 | 5/2017 | Stinebring et al. |
| 2003/0185648 A1 | 10/2003 | Blaess |
| 2003/0209897 A1 | 11/2003 | Manwaring et al. |
| 2003/0227163 A1 | 12/2003 | Murakami et al. |
| 2004/0200306 A1 | 10/2004 | Schafer |
| 2006/0049621 A1 | 3/2006 | Lee |
| 2007/0137379 A1 | 6/2007 | Sanji et al. |
| 2007/0194563 A1 | 8/2007 | Menjak et al. |
| 2008/0106086 A1 | 5/2008 | Shimoda |
| 2009/0200783 A1 | 8/2009 | Cymbal |
| 2012/0125139 A1 | 5/2012 | Tinnin et al. |
| 2012/0125140 A1 | 5/2012 | Ridgway et al. |
| 2013/0205933 A1 | 8/2013 | Moriyama |
| 2013/0233117 A1 | 9/2013 | Read et al. |
| 2014/0053677 A1 | 2/2014 | Sakata |
| 2014/0109713 A1 | 4/2014 | Bodtker |
| 2014/0109714 A1 | 4/2014 | Bodtker |
| 2014/0137694 A1 | 5/2014 | Sugiura |
| 2014/0147197 A1 | 5/2014 | Yoshida et al. |
| 2014/0230596 A1 | 8/2014 | Kwon |
| 2015/0028574 A1 | 1/2015 | Meyer et al. |
| 2015/0069747 A1 | 3/2015 | Sharman et al. |
| 2015/0166093 A1 | 6/2015 | Moriyama et al. |
| 2015/0232117 A1 | 8/2015 | Stinebring et al. |
| 2015/0239490 A1 | 8/2015 | Sakata |
| 2015/0251683 A1 | 9/2015 | Caverly et al. |
| 2016/0046318 A1 | 2/2016 | Stinebring et al. |
| 2016/0252133 A1 | 9/2016 | Caverly |
| 2017/0129529 A1* | 5/2017 | Martinez ............... B62D 1/189 |

\* cited by examiner

US 10,464,592 B2

STEERING COLUMN MOTION CONTROL ASSEMBLY

BACKGROUND OF THE INVENTION

The embodiments disclosed herein relate to a telescope and adaptive energy absorption system for a vehicle steering system.

Telescopically adjustable steering columns generally include a telescope actuator and column jacket having lower and upper jackets. The column jacket is longitudinally moveable and internally collapsible along a longitudinal axis between a "full out" position in which the column jacket is fully extended and a "full in" position in which the column jacket is fully retracted. This collapsibility is energy-absorbing (E/A) and may be beneficial during a vehicle impact event.

The telescope actuator may be mounted to a fixed bracket on one end thereof and mounted to a telescoping bracket on the opposite end. The telescoping bracket is attached to the column's upper jacket via one or more energy absorption rivets and via one or more energy absorption straps. In a vehicle rear collision, the force generated may shear the rivet(s) and begin to deform the strap(s), thus causing the steering wheel position to change. The rearward forces placed on the fastener(s) may arise from multiple causes, including the inertial forces of the rearward accelerating wheel and column masses (relative to the vehicle body), and also those of the driver pulling rearward on the steering wheel in a rear collision.

SUMMARY OF THE INVENTION

According to an aspect of the invention, a steering column assembly includes a lower jacket assembly extending along a steering column axis. Also included is an upper jacket assembly at least partially received within the lower jacket assembly, the upper jacket assembly extendable along the steering column axis relative to the lower jacket assembly. Further included is a telescope actuator assembly configured to translate the upper jacket assembly relative to the lower jacket assembly. Yet further included is a telescope drive bracket of the telescope actuator assembly, the telescope drive bracket operatively coupled to the upper jacket assembly with a mechanical fastener disposed in a bracket slot located within the telescope drive bracket, the mechanical fastener moveable with the upper jacket assembly in a single axial direction along the steering column axis.

According to another aspect of the invention, a steering column assembly includes an upper jacket assembly received within a lower jacket assembly. Also included is a telescope actuator assembly configured to translate the upper jacket assembly relative to the lower jacket assembly along a steering column axis. The telescope actuator assembly includes a telescope drive bracket operatively coupled to the upper jacket assembly, the telescope drive bracket coupled to the upper jacket with a rivet at a first coupling location and with a screw at a second coupling location, the screw disposed in a bracket slot located within the telescope drive bracket, the screw moveable with the upper jacket assembly in a single axial direction along the steering column axis. The telescope actuator assembly also includes a telescope actuator disposed on the lower jacket assembly and operatively coupled to the telescope drive bracket by a lead screw. The steering column assembly further includes an energy absorption assembly that includes a first energy absorption strap having a first portion defining an opening configured to receive a pin of an actuator disposed on the telescope drive bracket and a second portion coupled to the upper jacket assembly. The energy absorption assembly also includes a second energy absorption strap having a third portion coupled to the telescope drive bracket and a fourth portion coupled to the upper jacket assembly.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated is a steering column assembly having features that accommodate telescoping movement of the steering column assembly, while providing safety benefits during a collision at the rear end of the vehicle. In the illustrated embodiments, the steering column assembly is a cantilevered power steering column.

Figure 1:
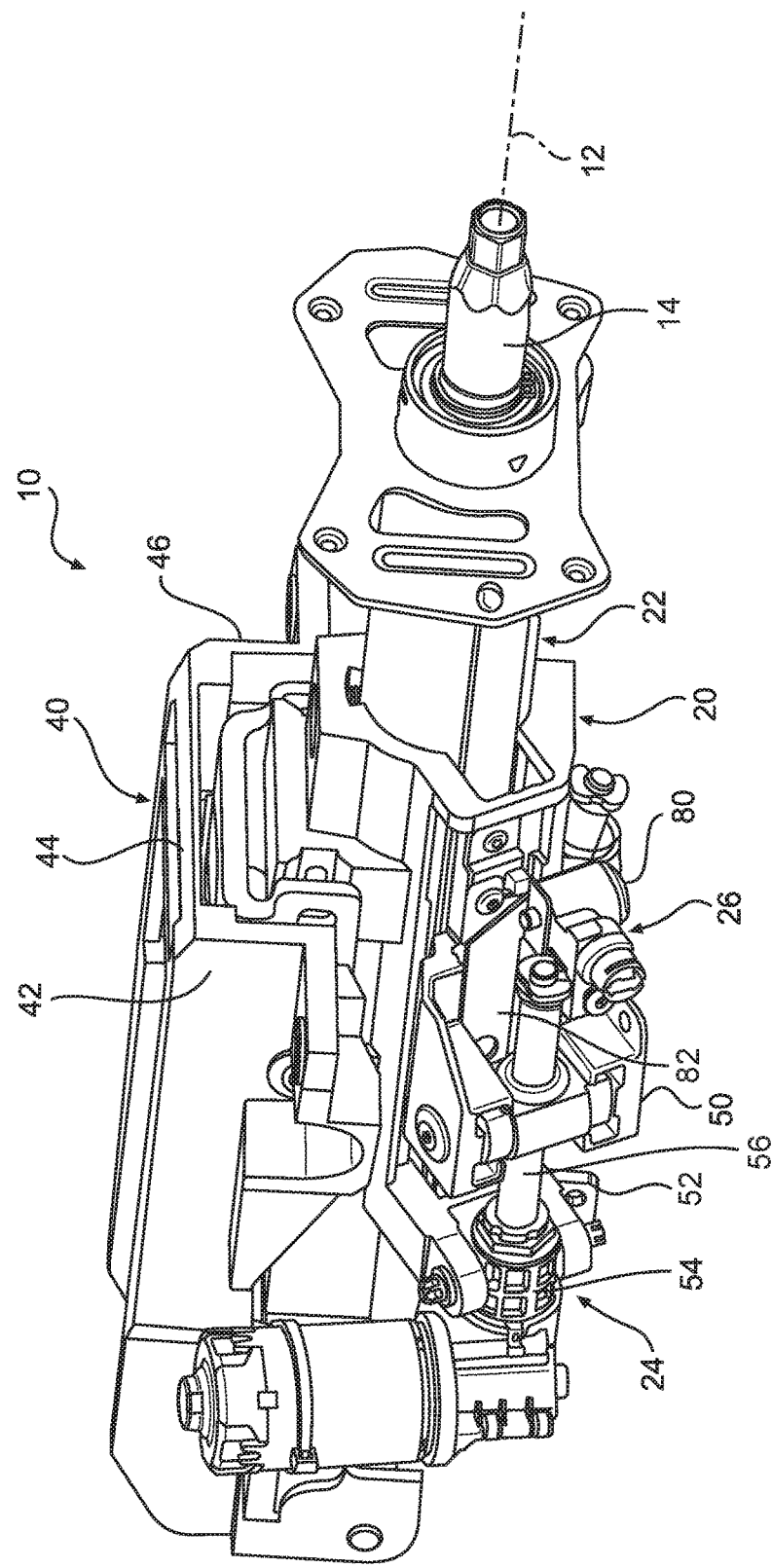
FIG. 1 is a perspective view of a steering column assembly.

Referring to FIG. 1, steering column assembly 10 is shown. The steering column assembly 10 extends along a steering column axis 12. The steering column assembly 10 is an adjustable telescopic steering column assembly. A steering shaft 14 extends through the steering column assembly 10 along the steering column axis 12. The steering column assembly 10 includes a lower jacket assembly 20, an upper jacket assembly 22, a telescope actuator assembly 24, and an energy absorption assembly 26.

The upper jacket assembly 22 extends longitudinally along the steering column axis 12. The upper jacket assembly 22 is telescopically or slidably received within the lower jacket assembly 20. The lower jacket assembly 20 and/or the upper jacket assembly 22 are extendable along the steering column axis 12 with respect to each other. The telescope actuator assembly 24 is configured to translate the upper jacket assembly 22 relative to the lower jacket assembly 20.

The lower jacket assembly 20 extends along the steering column axis 12. The lower jacket assembly 20 defines an inner bore that slidably or telescopically receives at least a portion of the upper jacket assembly 22. The lower jacket assembly 20 is operatively connected to a vehicle structure by a mounting bracket 40. Throughout this specification, the term "attach," "attachment," "connected", "coupled," "coupling," "mount," or "mounting" shall be interpreted to mean that one structural component or element is in some manner connected to, or contacts another, element—either directly or indirectly through at least one intervening structural element—or is integrally formed with the other structural element. Accordingly, it should be appreciated that the lower jacket assembly 20 may be connected to the mounting bracket 40 in several different ways using at least one different structural element interconnecting the lower jacket assembly 20 and mounting bracket 40 to each other.

The mounting bracket 40 is configured as a rake bracket to adjust the pitch or rake of the lower jacket assembly 20 and the upper jacket assembly 22. The mounting bracket 40 includes a first plate 42, a top plate 44, and a second plate 46. The first plate 42 is disposed opposite the second plate 46. The top plate 44 extends between upper portions of the first plate 42 and the second plate 46.

The energy absorption assembly 26 extends between the lower jacket assembly 20 and the upper jacket assembly 22. The energy absorption assembly 26 translates with upper jacket assembly 22 during operation of the telescope actuator assembly 24 to adjust the position of the upper jacket assembly 22 relative to the lower jacket assembly 20. The energy absorption assembly 26 is configured to provide a drag load or force opposing stroking or translation of the upper jacket assembly 22 relative to the lower jacket assembly 20 to decelerate the steering column assembly 10 during a collapse event. The drag load or force opposing stroking of the upper jacket assembly 22, relative to the lower jacket assembly 20, is adaptive or variable based on the loads encountered during the collapse event and the configuration of the energy absorption assembly 26.

In the illustrated embodiment, the energy absorption assembly 26 includes multiple energy absorption (EA) straps arranged in what is referred to as a "nested" arrangement. In the illustrated example, a first energy absorption strap 80 (first EA strap 80) and a second energy absorption strap 82 (second EA strap 82) are included. Both the first and second EA straps 80, 82 are substantially U-shaped in some embodiments. The EA straps 80, 82 are each operatively coupled to the upper jacket 22. The EA straps 80, 82 each absorb energy during a collapse event of the steering column. Respective mechanisms engage the EA straps 80, 82 to maintain the straps in an active condition that absorbs energy during a collapse event. In some embodiments, the energy absorption assembly 26 may be selectively switched between multiple load requirements. For example, when a lower energy absorption load is required, only one of the EA straps is required to be engaged.

The telescope actuator assembly 24 includes a telescope drive bracket 50, a mounting plate 52, a telescope actuator 54, and a lead screw 56. The telescope drive bracket 50 is coupled to the upper jacket assembly 22 via the mounting plate 52 disposed between the telescope drive bracket 50 and the upper jacket assembly 22. The mounting plate 52 is mounted to the steering column assembly 10 by any appropriate method, such as fastening, welding, or other joining method.

Figure 2:
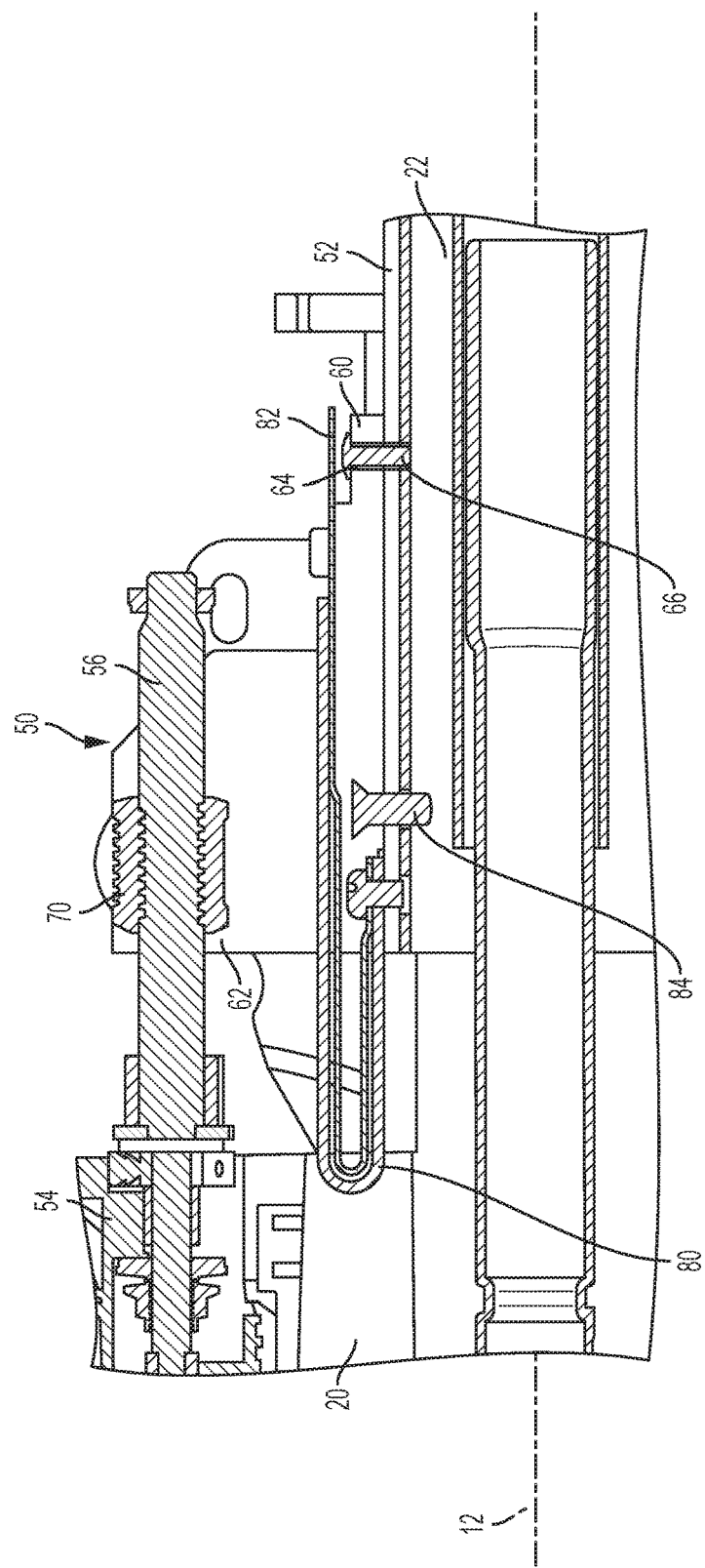
FIG. 2 is a partial cross-sectional view of the steering column assembly.

Referring now to FIG. 2, with continued reference to FIG. 1, the telescope drive bracket 50 extends generally away from the steering column axis 12. The telescope drive bracket 50 includes a base portion 60 disposed proximate the upper jacket assembly 22 and a body portion 62 extending away from the base portion 60. The base portion 60 defines a base slot 64 configured to receive a fastener 66, such as a rivet, to couple the telescope drive bracket 50 to the upper jacket assembly 22. The body portion 62 of the telescope drive bracket defines an opening or an aperture extending completely through the body portion 62. The aperture is disposed substantially parallel to the steering column axis 12. The body portion 62 includes a jackscrew nut 70 disposed within the aperture.

The telescope actuator 54 is spaced apart from the telescope drive bracket 50. The telescope actuator 54 is disposed on the lower jacket assembly 20. The telescope actuator 54 is operatively connected to the telescope drive bracket 50 via the lead screw 56. The lead screw 56 extends from the telescope actuator 54 through the aperture of the telescope drive bracket 50 and engages the jackscrew nut 70 to interconnect the telescope drive bracket 50 and the telescope actuator 54. The telescope actuator 54 imparts rotary motion to the lead screw 56 and the telescope drive bracket 50 converts the rotary motion into linear motion to translate the upper jacket assembly 22 along the steering column axis 12 relative to the lower jacket assembly 20. The telescope actuator 54 may be an electronic actuator, hydraulic actuator, pneumatic actuator, or the like.

As shown in FIG. 2, the telescope drive bracket 50 is secured to the upper jacket assembly via three connections. First, the telescope drive bracket 50 is operatively coupled to the upper jacket assembly 22 via the rivet 66 that extends through the base portion 60 of the telescope drive bracket 50 and into the upper jacket assembly 22. Second, the telescope drive bracket 50 is operatively coupled to the upper jacket assembly 22 via the energy absorption assembly 26. Specifically, the first and second EA straps 80, 82 are operatively coupled to the telescope drive bracket 50 and to the upper jacket assembly 22 with one or more mechanical fasteners. Third, the telescope drive bracket 50 is operatively coupled to the upper jacket assembly 50 with a mechanical fastener 84, such as a screw, bolt or the like. The mechanical fastener 84 may be located where a rivet fastener was previously located. However, rivets shear per their shear load and begin to deform the EA straps during a vehicle rear collision, thereby causing the steering wheel position to change.

Figure 4:
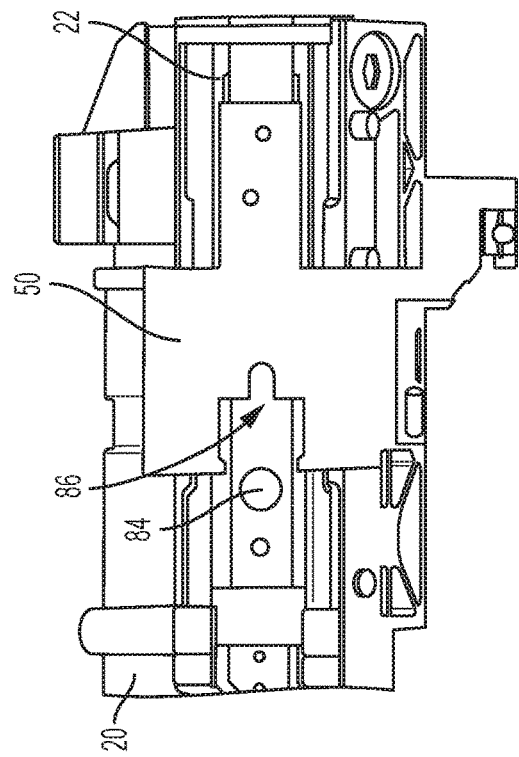
FIG. 4 is an elevational view of the steering column assembly in a second telescope position.
Figure 3:
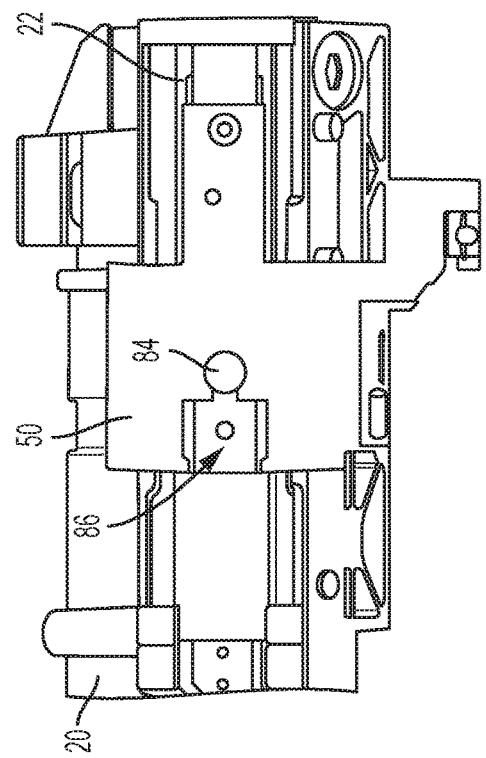
FIG. 3 is an elevational view of the steering column assembly in a first telescope position.

Referring now to FIGS. 3 and 4, the attachment of the telescope drive bracket 50 to the upper jacket assembly 22 is illustrated further. As shown in FIG. 3, the mechanical fastener 84 is disposed in a bracket slot 86 located within the base portion 60 of the telescope drive bracket 50, and defined by a slot wall of the base portion 60. The mechanical fastener 84 provides unidirectional axial retention, as well as radial retention, while holding the telescope drive bracket 50. During a rear collision event, the mechanical fastener 84 would need to fracture in order for there to be movement of the steering wheel. During a non-rear vehicle collision, the steering column and the steering wheel stroke towards the front of the vehicle. In this case, the mechanical fastener 84 releases from the bracket slot 86 and translates with the upper jacket assembly 22 that it is attached to, as shown in FIG. 4, thereby allowing normal stroke in this direction. However, movement in the opposite direction (i.e., rear of vehicle) is not permitted.

The material of the mechanical fastener 84 (e.g., screw) and the size of the fastener will vary depending upon the particular application of use. Additional load from the fastener interface can be tuned according to design requirements via screw geometry and torque, for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
a lower jacket assembly extending along a steering column axis;
an upper jacket assembly at least partially received within the lower jacket assembly, the upper jacket assembly extendable along the steering column axis relative to the lower jacket assembly;
a telescope actuator assembly configured to translate the upper jacket assembly relative to the lower jacket assembly; and
a telescope drive bracket of the telescope actuator assembly, the telescope drive bracket operatively coupled to the upper jacket assembly with a rivet at a first coupling location and with a screw at a second coupling location, the screw disposed in a bracket slot located within the telescope drive bracket, the screw moveable with the upper jacket assembly in a single axial direction along the steering column axis.

2. The steering column assembly of claim 1, wherein the screw is moveable axially out of the bracket slot.

3. The steering column assembly of claim 1, wherein the screw is radially constrained when disposed in the bracket slot.

4. The steering column assembly of claim 1, wherein the mechanical fastener is a rivet.

5. The steering column assembly of claim 1, wherein the telescope drive bracket is operatively coupled to the upper jacket assembly with the rivet.

6. The steering column assembly of claim 1, wherein the telescope drive bracket is operatively coupled to the upper jacket assembly with an energy absorption assembly.

7. The steering column assembly of claim 6, wherein the energy absorption assembly comprises at least one energy absorption strap.

8. The steering column assembly of claim 7, wherein the at least one energy absorption strap is a first energy absorption strap, the energy absorption assembly further comprising a second energy absorption strap.

9. The steering column assembly of claim 8, wherein the first and second energy absorption straps are disposed in a nested arrangement.

10. The steering column assembly of claim 1, wherein the single axial direction that the screw is moveable in is toward a front end of the steering column.

11. A steering column assembly comprising:
an upper jacket assembly received within a lower jacket assembly;
a telescope actuator assembly configured to translate the upper jacket assembly relative to the lower jacket assembly along a steering column axis, the telescope actuator assembly comprising:
a telescope drive bracket operatively coupled to the upper jacket assembly, the telescope drive bracket coupled to the upper jacket with a rivet at a first coupling location and with a screw at a second coupling location, the screw disposed in a bracket slot located within the telescope drive bracket, the screw moveable with the upper jacket assembly in a single axial direction along the steering column axis; and
a telescope actuator disposed on the lower jacket assembly and operatively coupled to the telescope drive bracket by a lead screw; and
an energy absorption assembly comprising:
a first energy absorption strap having a first portion defining an opening configured to receive a pin of an actuator disposed on the telescope drive bracket and a second portion coupled to the upper jacket assembly; and
a second energy absorption strap having a third portion coupled to the telescope drive bracket and a fourth portion coupled to the upper jacket assembly.

12. The steering column assembly of claim 11, wherein the telescope drive bracket includes a jackscrew nut that receives the lead screw such that the telescope drive bracket imparts linear motion to the upper jacket assembly from the telescope actuator via the lead screw to translate the upper jacket assembly relative to the lower jacket assembly.

13. The steering column assembly of claim 12, wherein during operation of the telescope actuator assembly, the energy absorption assembly translates with upper jacket assembly as the upper jacket assembly is translated relative to the lower jacket assembly.

14. The steering column assembly of claim 11, wherein the screw is moveable axially out of the bracket slot.

15. The steering column assembly of claim 11, wherein the screw is radially constrained when disposed in the bracket slot.

16. The steering column assembly of claim 11, wherein the telescope drive bracket is operatively coupled to the upper jacket assembly with a rivet.

17. The steering column assembly of claim 11, wherein the first and second energy absorption straps are disposed in a nested arrangement.

18. The steering column assembly of claim 11, wherein the single axial direction that the mechanical fastener is moveable in is toward a front end of the steering column.

* * * * *